(12) United States Patent
Rampen et al.

(10) Patent No.: US 8,347,621 B2
(45) Date of Patent: Jan. 8, 2013

(54) METHOD OF OPERATING A FLUID-WORKING MACHINE AND A FLUID-WORKING MACHINE

(75) Inventors: Win Rampen, Edinburgh Lothian (GB); Onno Kuttler, Edinburgh Lothian (GB); Niall James Caldwell, Edinburgh Lothian (GB)

(73) Assignee: Sauer-Danfoss APS, Nordborg (DK)

( * ) Notice: Subject to any disclaimer, the term of this patent is extended or adjusted under 35 U.S.C. 154(b) by 959 days.

(21) Appl. No.: 12/309,541

(22) PCT Filed: Jul. 23, 2007

(86) PCT No.: PCT/GB2007/050435
§ 371 (c)(1),
(2), (4) Date: Jan. 22, 2009

(87) PCT Pub. No.: WO2008/012577
PCT Pub. Date: Jan. 31, 2008

(65) Prior Publication Data
US 2009/0241530 A1 Oct. 1, 2009

(30) Foreign Application Priority Data

Jul. 24, 2006 (GB) .................................. 0614630.2

(51) Int. Cl.
*F16H 61/40* (2010.01)
*F03C 1/04* (2006.01)

(52) U.S. Cl. ............................... 60/468; 60/459; 60/494

(58) Field of Classification Search ..................... 60/432, 60/433, 459, 464, 468, 494; 91/491
See application file for complete search history.

(56) References Cited

U.S. PATENT DOCUMENTS

| 3,170,450 | A | | 2/1965 | Kent et al. | |
| 4,503,751 | A | * | 3/1985 | Pinson | 91/491 |
| 4,785,714 | A | * | 11/1988 | Tamada et al. | 91/491 |
| 5,325,669 | A | | 7/1994 | Barker et al. | |
| 6,339,929 | B1 | * | 1/2002 | Udagawa et al. | 60/468 |
| 6,442,934 | B1 | * | 9/2002 | Okuda et al. | 60/451 |
| 6,681,568 | B2 | * | 1/2004 | Smith | 60/468 |
| 6,681,571 | B2 | * | 1/2004 | Bailey et al. | 60/489 |
| 6,694,859 | B2 | * | 2/2004 | Smith | 60/468 |
| 8,052,401 | B2 | * | 11/2011 | Kovach et al. | 91/491 |

FOREIGN PATENT DOCUMENTS

| EP | 0 494 236 | 12/1995 |
| EP | 1 319 836 | 6/2003 |
| WO | 2006/055978 | 5/2006 |

OTHER PUBLICATIONS

International Search Report for PCT/GB2007/050435, mailed Jan. 3, 2008.

\* cited by examiner

*Primary Examiner* — Thomas E Lazo
(74) *Attorney, Agent, or Firm* — Nixon & Vanderhye, P.C.

(57) ABSTRACT

The present invention provides a method of controlling a fluid working machine (12) having a plurality of working cylinders (14) having pistons (16) therein and arranged to drive a shaft (18), in which said cylinders are supplied with pressurized working fluid via a manifold (24), the contents of which may be 5 purged by a de-pressurizer taking one of a number for forms such as to allow re-activation of said machine (10).

24 Claims, 5 Drawing Sheets

METHOD OF OPERATING A FLUID-WORKING MACHINE AND A FLUID-WORKING MACHINE

This application is the U.S. national phase of International Application No. PCT/GB2007/050435, filed 23 Jul. 2007 which designated the US and claims priority to Great Britain Application No. 0614630.2, filed 24 Jul. 2006, the entire contents of each of which are hereby incorporated by reference.

The present invention relates to a method of operating a fluid working machine and a fluid working machine itself and relates particularly, but not exclusively, to a method of operating a machine and a machine having direct acting valves controlling pressurised fluid.

DISCUSSION OF PRIOR ART

EP-B-0494236 provides fluid working machine having a plurality of cylinders, a high pressure fluid manifold for supplying high pressure fluid to said cylinders, a low pressure fluid manifold for receiving spent fluid from said cylinders and returning it to a sump, a plurality of poppet valves associated with each chamber and manifold for controlling the flow of fluid into and out of said cylinders. The valves themselves comprise electromagnetic poppet valves and the machine further includes a mechanism for actuating the valves so as to employ the pre-compression and expansion of the contents of a working chamber to create a motoring cycle of the machine. Working cylinders of the machine are selected in real time so that fluid power is controllably converted to shaft power and vice versa, thus allowing a controllable bi-directional energy flow. The structure of poppet valves is such that the fluid pressure acts over the seating area creating a large closing force. The valves employed must be able to actuate quickly enough to commutate the machine at high speed and in order to achieve this they must be direct-acting rather than piloted valves. Such direct acting valves rely on the energy from an already spinning shaft to facilitate the opening thereof against the pressure in the high-pressure manifold. This requirement presently limits the use of this technique to conditions where the machine is already operating above a threshold shaft speed. For applications with the requirement of starting from zero speed, the motoring cycle must be initiated by different means.

SUMMARY OF THE INVENTION

It is an aim of the invention to provide a method of starting a fluid-working machine from a stationary condition by the provision of a depressuriser in the supply circuit, in order to de-pressurise the fluid supply to the fluid-working machine, such as to isolate the high pressure fluid supply therefrom and facilitate re-setting of the machine to a condition from which starting or re-starting is possible.

Accordingly, the present invention provides method of controlling a fluid working machine having: a driven shaft; a plurality of working chambers of cyclically varying volume; a High Pressure manifold and a Low Pressure manifold; one or more High Pressure valves between one or more of said working chambers and said High Pressure manifold; one or more Low Pressure Valves between one or more of said working chambers and said Low Pressure manifold; and a de-pressuriser connected to said High Pressure manifold; the method including the step of: monitoring one or more parameters indicative of motor activity: and actuating said de-pressuriser after detection of a pre-determined condition, thereby to release pressurised fluid within said high pressure supply. Such an arrangement releases pressurised fluid within said high pressure supply which might otherwise hinder or prevent re-starting of said fluid-working machine.

Preferably, the method includes the step of depressurising said High Pressure manifold by operating a valve connected between said high pressure manifold and a low pressure source of fluid. Alternatively, this may be done by operating a valve adjacent said motor and connected between said high pressure manifold and a low pressure source of fluid. In a still further arrangement this may be done by operating said pump in reverse, thereby to draw high pressure fluid from said supply line and return it to a source of low pressure fluid. In a still further arrangement this may be done by causing said pump to go "over centre", thereby to allow fluid to pass through said pump from said supply line and return it to a source of low pressure fluid.

Advantageously, the monitored parameter is one or other of: engine shaft position, vehicle throttle position, vehicle gearbox, vehicle brake or vehicle movement.

In a preferred arrangement the method includes the step of determination of the new intended direction of motion of the motor, which may be made after depressurisation of said high pressure manifold is completed.

Advantageously, the method includes the step of pre-positioning one or more of said High Pressure and/or Low Pressure valves during or after the de-pressurisation step. This method may including the further step of pre-positioning said valves in the sequence of subsequent operation.

Preferably, the method includes the step of de-activating said depressuriser prior to a subsequent recommencement of fluid flow to said cylinders.

Conveniently, the method includes the step of setting said High Pressure and Low Pressure valves to cause forward direction motion of said shaft upon supply of fluid to said cylinders. This is preferably done by setting said High Pressure and Low Pressure valves to cause reverse direction motion of said shaft upon supply of fluid to said cylinders. The method may include the step of commencing a valve activation sequence after de-pressurisation, including the step of actuating said valves in a sequence associated with the desired direction of shaft motion. The valve activation may be separated, thereby to avoid valve pulse overlapping.

According to another aspect of the present invention there is provided a fluid working machine having: an output shaft; a plurality of working chambers of cyclically varying volume; a High Pressure manifold and a Low Pressure manifold; one or more High Pressure valves between one or more of said working cylinders and said High Pressure manifold; one or more Low Pressure Valves between one or more of said working cylinders and said Low Pressure manifold; and a de-pressuriser connected to said High Pressure manifold. Such an arrangement facilitates the release of pressurised fluid within said high pressure supply which might otherwise hinder or prevent re-starting of said fluid-working machine.

Preferably, said de-pressuriser comprises a valve connected between said supply manifold and a source of low pressure fluid. Alternatively, said de-pressuriser may comprise a valve adjacent said motor and distant from said pump and being connected between said supply manifold and a source of low pressure fluid. In a further arrangement, said de-pressuriser may comprise said pump and wherein said pump is reversible, thereby to withdraw fluid from said supply manifold. Alternatively, said de-pressuriser may comprise said pump and wherein said pump can go "over centre" so as to allow fluid form said supply manifold to pass through said pump.

Advantageously, the machine includes a monitor for monitoring one or other of: engine shaft position, vehicle throttle position, vehicle gearbox, vehicle brake or vehicle movement and may also include a controller for receiving monitored parameters and for causing operation of said valves in accordance with a pre-defined operating methodology.

In a preferred arrangement said working chambers comprise cylinders having pistons contained and movable therein and in which said pistons are connected to said shaft for rotational movement of said shaft upon movement of said pistons. Alternatively, said working chambers may be defined by a movable diaphragm.

Advantageously, said shaft includes an eccentric cam surface and said pistons are operably connected thereto for driving said cam and shaft upon movement of said pistons.

REFERENCE TO DRAWINGS

The present invention will now be more particularly described by way of example only with reference to the accompanying drawings, in which.

SPECIFIC DESCRIPTION OF INVENTION

Figure 1:
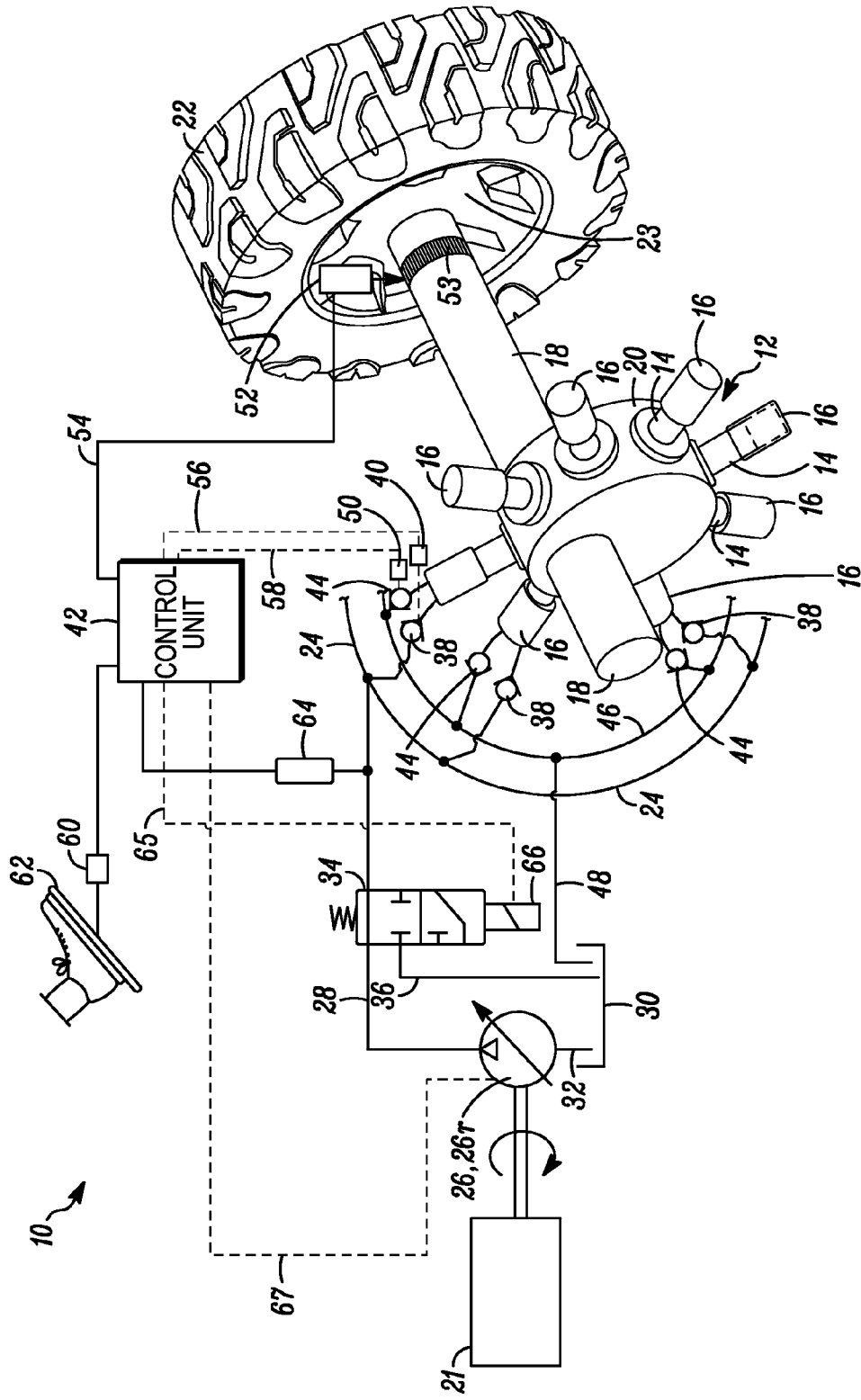
FIG. 1 is a diagrammatic representation of the present apparatus as arranged to drive a road wheel of a vehicle.

Referring now particularly to FIG. 1, a system shown generally at 10 comprises a fluid working machine in the form of, for example, a hydraulic motor 12 having a plurality of pistons 14 within cylinders or working chambers 16. A driveshaft 18 is connected to said pistons for movement thereby and, in the example shown, the connection may be via an eccentric cam surface 20 provided on said shaft against which the bottom surface of the pistons operate. Variation of the working volume within the cylinder causes the piston to move and act on said cam 20 and initiates rotation of said shaft. Other forms of piston to shaft connection will present themselves to those skilled in the art. A prime mover in the form of, for example, an internal combustion engine or electric motor is provided at 21 and coupled to drive said pump as and when necessary.

The driveshaft is connected directly or indirectly to a driven member such as, for example, a vehicle wheel 22 and brake arrangement 23 as shown here. A high pressure manifold 24 is connected to a high pressure pump 26 via a supply line 28 and the pump itself draws fluid from a sump 30 via sump line 32. In one possible configuration a solenoid-operated two-position two, or three, port valve 34 is positioned within the supply line 28 and is operable to connect the inlet of the high pressure manifold 24 to either the high pressure supply line 28 or a sump line 36 which directs fluid back to said sump 30 in a manner to be described in more detail later herein. A high pressure (inlet) valve 38 is provided in association with each cylinder or working chamber 14 for the provision of fluid thereto.

The valves themselves may take any one of a number of forms but are preferably high speed direct-acting poppet valves as such valves are able to provide rapid valve movement to allow speedy fluid supply whilst also providing excellent sealing against the internal pressure created within the chamber. In the preferred arrangement the valves are electrical solenoid actuated valves, the electrical actuator portion of which is shown schematically at 40 and which is connected to a control unit or computer 42 to cause actuation in accordance with a defined control regime, also as described later herein. A low pressure (outlet) valve 44 is provided in association with each cylinder or working chamber 14 and, again, these are each connected to a manifold in the form of low pressure manifold 46. The low pressure manifold 46 is connected directly to the sump 30 via line 48 and acts to return fluid thereto as and when desired. Once again, the low pressure valves 44 are preferably electrical solenoid actuated valves, the electrical actuator portion of which is shown schematically at 50 and which is connected to a control unit or computer 42 to cause actuation in accordance with a defined control regime, also as described later herein. The fluid-working machine is also provided with an absolute position sensor 52 for detecting the angular position of markings 53 on the shaft 18, thereby to determine which cylinders are on the driving side of the cammed surface 20. Said sensor is also linked via line 54 for supplying shaft position data to control unit or computer 42.

Also shown in FIG. 1 are control lines 56, 58 linking the high pressure (HP) and low pressure (LP) valves to the controller 42 and which are used to transmit control data/signals from said controller to said valves. The other side of the controller 42 is connected to a vehicle throttle sensor 60 linked to the throttle 62 and to a pressure sensor 64 provided to sense the pressure in supply line 28. A further control line 65 is provided to connect the actuator portion 66 of valve 34 to said controller/computer 42 whilst control line 67 connects the pump 26 to said controller/computer for control thereby.

Those skilled in the art will appreciate that the main function of valve 34 is to allow for the purging of high pressure fluid from the supply line as and when required in order to allow for the "re-starting" of the motor itself. The function of the valve 34 could be replicated by other means such as, for example, a reversible high pressure pump identified as 26r in FIG. 1. If such a pump is employed, one simply needs to cause the reversal thereof so as to allow the pump to go "over centre" when one wishes to de-pressurise the supply line 28 and thus cause fluid to be returned to sump 30 via the pump 26r itself.

Figure 2:
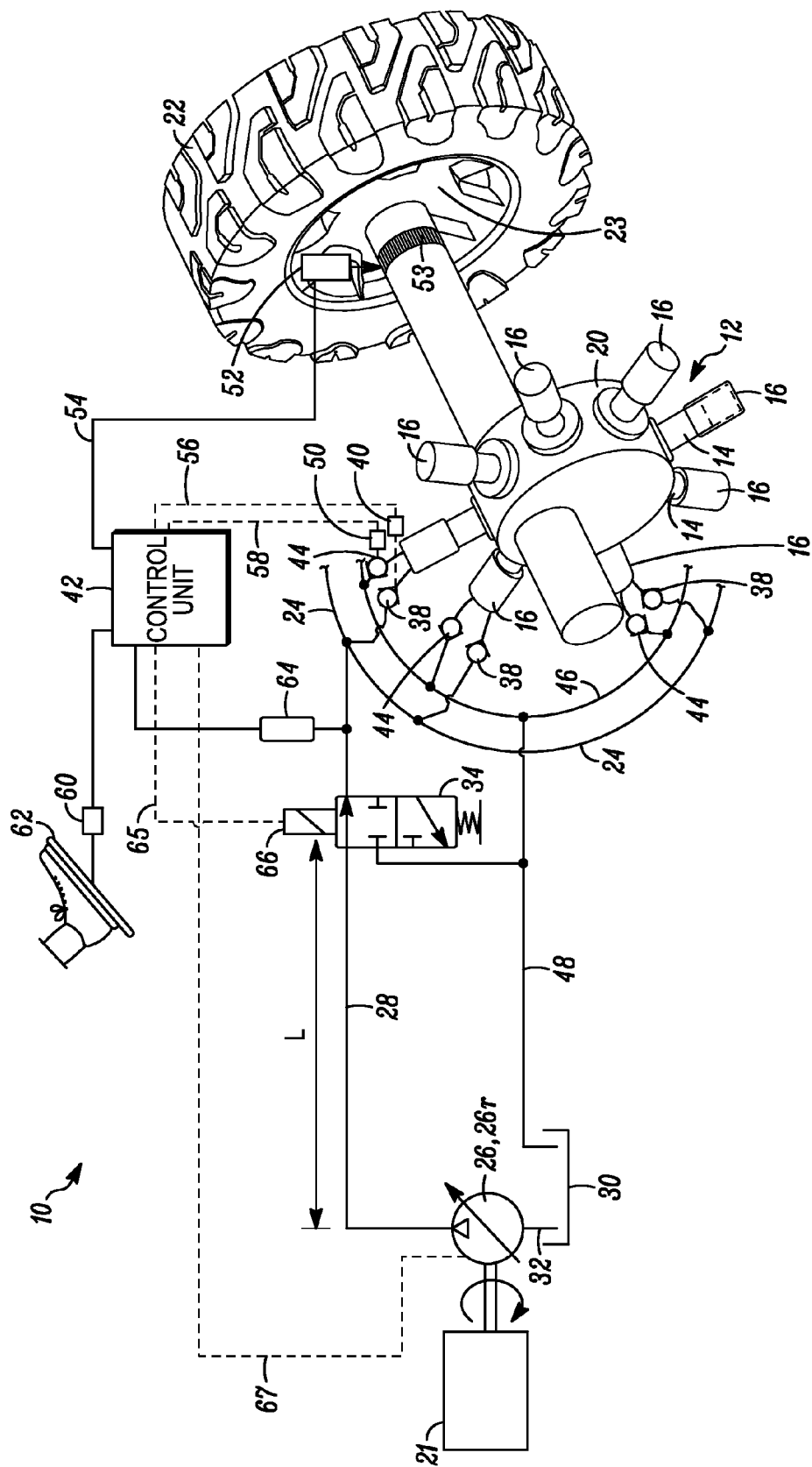
FIGS. 2 to 4 illustrate alternative arrangements of the present invention.
Figure 3:
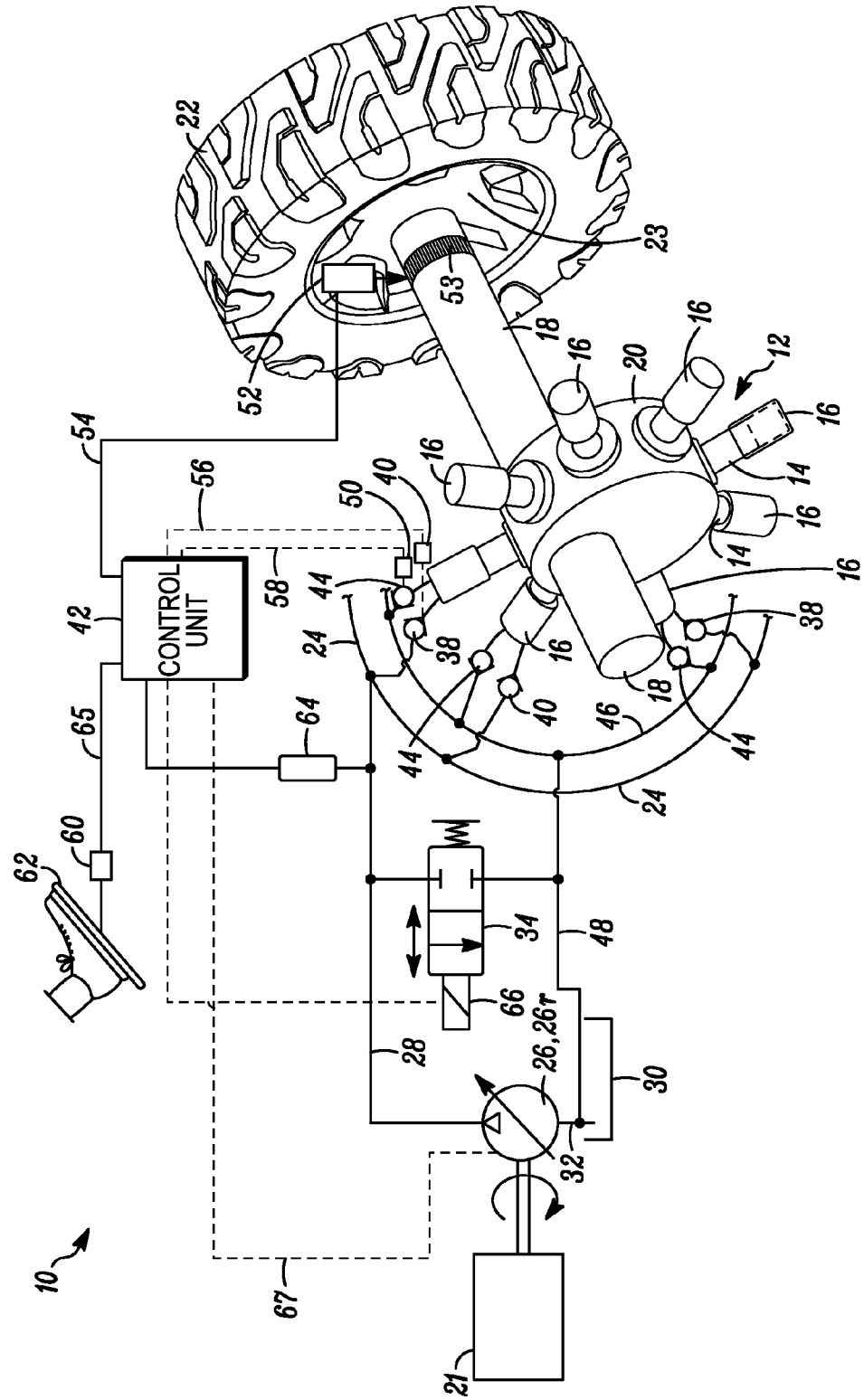
Figure 4:
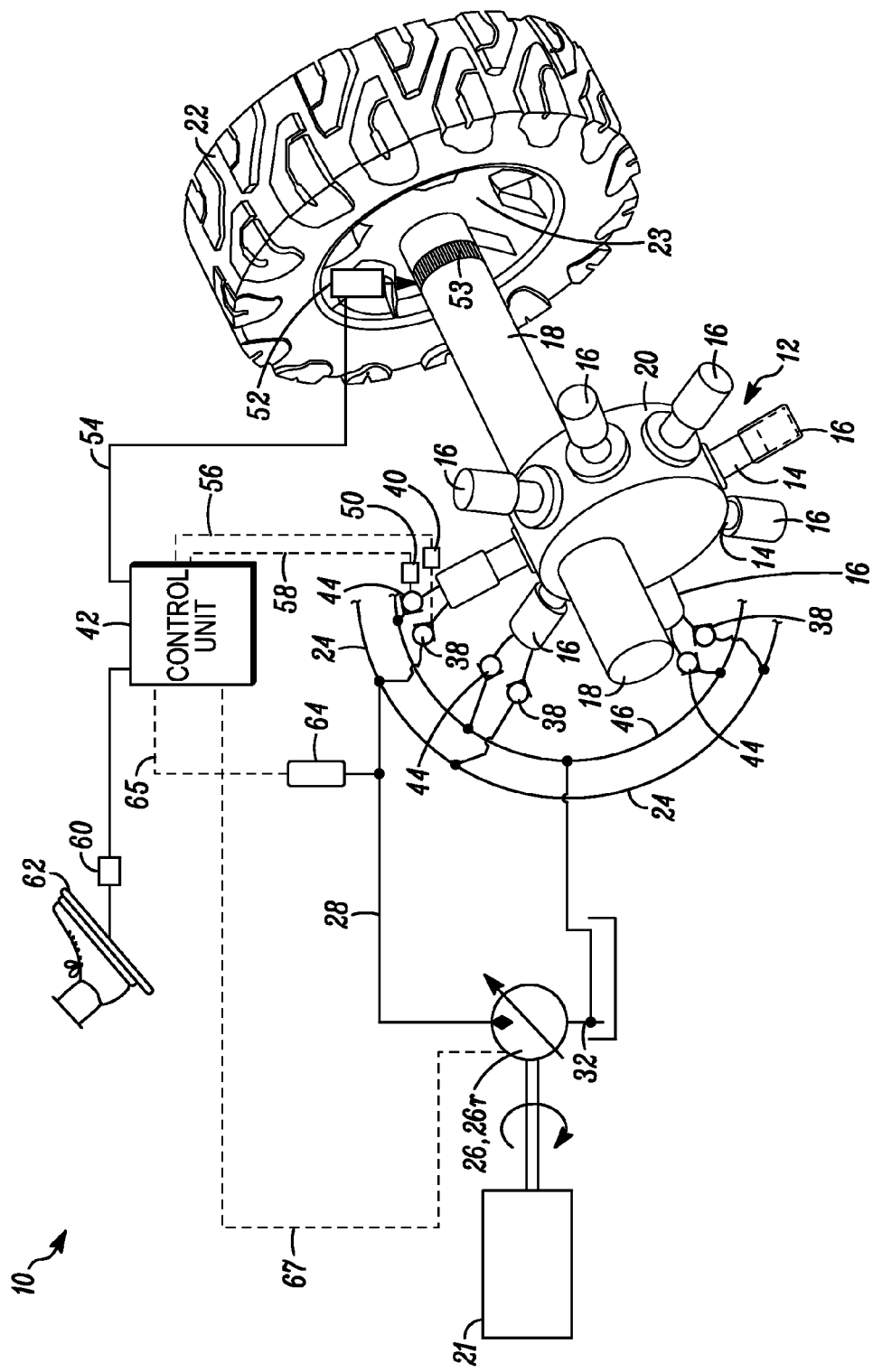

It will be appreciated that alternative forms of pump and valve arrangements may be employed, some of which are illustrated in FIGS. 2 to 4. Referring briefly to FIG. 2, it will be appreciated that in certain applications, it may be necessary to locate the motors at a remote position relative to the pump 26. In such an arrangement the length L of the high pressure supply line 28 may be very significant and, consequently, it may contain a large amount of pressurised fluid and would take considerable time to re-pressurise. In such an arrangement it is extremely desirable to locate the depressurizer 34 as close to the motor 12 as possible and thereby allow the vast majority of the supply line 28 to remain pressurised when the depressurizer 34 is activated. In the arrangement of FIG. 2, the depressurizer 34 provides its depressurizing output directly to the low pressure return line and thence to sump 30. FIG. 3 illustrates a still further arrangement in which the depressurizer in the form of valve 34 is positioned and controlled to simply dump the contents of the high pressure line 24 to the low pressure return line returning spent fluid to sump 30. FIG. 4 is a more specific arrangement in which the pump 26 itself is of the type that can go "over centre", thereby allowing any pressurised fluid in line 24 and 28 to be dumped directly to sump 30. It will be appreciated that this pump and others described herein may take any one of a number of forms such as digital displacement pump/motor or a more conventional arrangement.

Figure 5:
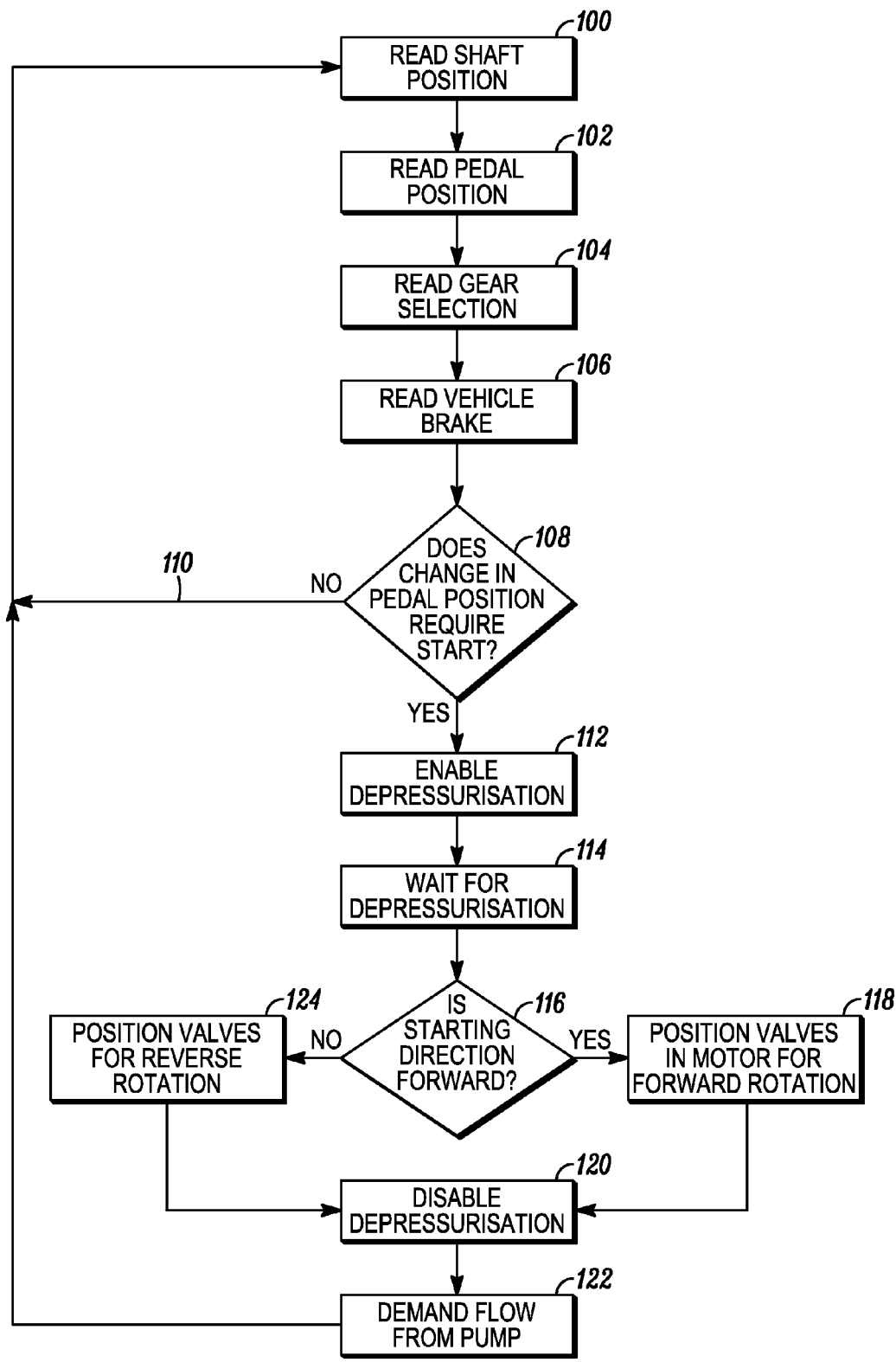
FIG. 5 is a flow diagram illustrating the monitoring and starting sequences associated with the method of the present invention.

Operation of the above described arrangement will now be discussed with particular reference to both FIG. 1 and FIG. 5, the latter of which is an operational flow-chart. In operation, the controller 42 of FIG. 1 is employed to monitor the position of the shaft and pedal at regular intervals. This may be done by continuous or discontinuous measuring/monitoring techniques so long as the position thereof is determined at sufficiently short intervals as to allow for corrective action within an acceptable time-period. These first two steps are illustrated at 100 and 102 respectively of FIG. 5. Depending upon the application of the vehicle, one may also include the step of monitoring the gearbox and/or vehicle brake to determine the possibility of reverse having been selected or the vehicle having been caused to stop by vehicle braking. These are shown as boxes 104 and 106 respectively. If the controller determines at 108 that the shaft is still rotating in the same direction and no action is necessary then the monitor loop is repeated as indicated by arrow 110. However, if the controller determines that the shaft and/or pedal position are such as to require controller intervention in order to "re-start" the motor 12 then a control signal is sent (step 112) to the dump valve 34 or pump 26r and said components are actuated to cause depressurising of the supply line 28 in the manner described above. The controller waits for depressurisation to be completed in step 114 before determining the intended future directional movement of the vehicle in step 116. This may be done by monitoring the gear selection 104 or any other suitable indicator. If the starting direction is forward then the controller initiates positioning of the valves in step 118 to allow forward rotation. In practice this requires depressurisation step 120 and a flow demand step 122 to be completed and the valves associated with pistons on the driving side of the cam surface 20 to be opened for receiving pressurised fluid from the HP manifold 46 and the valves on the other side of the cam 20 to be opened for discharging fluid from the associated cylinders to the LP manifold 46. As mentioned above, monitoring of position sensor 52 enables the system to determine which of the cylinders are on the driving side of the cam 20. The dump valve 34 is disabled through the action of the controller 42 so as to allow high pressure fluid to be supplied to the cylinders on the driving side of the cam 20. Alternatively, if the system employs a reversible pump 26r then the controller 42 simply initiates normal operation (pumping) of said pump 26r. The controller 42 is then employed to demand flow from the pump 26 or 26r in accordance with user demand which may be determined from the throttle or pedal position which it monitors. High pressure fluid is supplied to the relevant cylinders in accordance with demand and a pre-defined "firing" sequence so as to initiate and sustain movement of the shaft 18 and, hence, wheels 22. In the event that the controller 42 detects that the starting direction is the reverse of the previous direction then the valves must be reset in step 124 so as to allow reverse motion. In practice this is done in the manner described above with the valves on the driving side of the cam 20 being opened for receiving high pressure fluid and disabling the dump valve 34 or reverse flow on pump 26r before supplying high pressure fluid to the cylinders so as to drive the pistons associated therewith and cause rotation of the cam 20 and shaft 18. If the vehicle is required to move off in the same direction as before then the valve sequencing is recommenced as before.

Whilst it will be appreciated that there are a number of possible starting sequences that the valves may be subjected to, it has been found that the above-mentioned arrangement can benefit from an arrangement in which the valves of each cylinder are set-up or "fired" in the sequence that they would be actuated to initiate motion of the shaft 18. In this arrangement the valves are each actuated in turn so as to allow them to be re-set and this is done for one complete cycle or revolution of valve activation. A small time separation may be incorporated into the firing sequence so as to ensure that valve pulses do not overlap. Once this step has been completed the valves are each set in a position appropriate for recommencement of supply of high pressure fluid and actuation of the motor itself. It will be appreciated that the valves need not be operated in sequence and that, subject to appropriate power being available; they may all be actuated together or substantially together in order to reposition the valves. It will also be appreciated that the controller 42 is able to determine what the appropriate position of any valve should be as it is monitoring the shaft position and determines the direction of future rotation.

A reapplication of pressure may not cause the shaft 18 to rotate as desired. This might be due to an overload, the shaft moving during the time that the fluid working machine 12 is depressurized or the like. Though a brake 23 can be used on the shaft 18 to prevent rotation during the depressurize interval, in an additional embodiment an adjustment for the roll back is provided. The adjustment for the roll back on successive starting attempts causes the working cylinders 14 to be correctly connected to give the maximum starting torque.

When the working machine 12 is in operation, the control unit 42 is able to record the initial shaft position and the final shaft position after the re-pressurisation during a failed starting attempt. Thus, on a subsequent starting cycle the control unit 42 is able to assume the same angular shaft rotation occurs during the depressurized interval such that the control unit 42 arranges the first and second poppet valves 38, 44 so as to connect the appropriate working cylinders 14 to the correct manifolds 24, 46 given the expected position of the shaft 18 at re-pressurisation. In the event that the shaft 18 does not start to rotate in the desired direction at re-pressurization the control unit 42 is able to sense from the shaft sensor 52 that the starting sequence has failed and that the sequence needs to repeat. If the fluid supply in the fluid working machine 12 is being controlled in such a manner that the pressure of the machine is regulated then the pressure in the high pressure manifold 24, on each successive starting attempt, is set up such that the torque rises each time and the likelihood of a successful start increases. As each starting cycle is likely to require approximately 100 milliseconds, the operator would not be unduly inconvenienced by the delay incurred by multiple starting cycles.

Operation of the embodiments of FIGS. 2 to 4 is substantially as described above save for a few minor alterations. For example, in FIG. 2, the depressurizer 34 is operated to depressurise a relatively short section of the supply line 28 and, thereby, leave the vast majority still pressurised for future use. In FIG. 3, the depressurizer 34 is simply operated to depressurize the entire high pressure supply line 28 and return fluid therein to sump 30 via the low pressure return line 48. Operation of the FIG. 4 embodiment differs slightly in that the valve 34 is replaced by a pump 26 which is operable to go "over centre" so as to allow high pressure fluid from line 28 to pass through the pump itself to the low pressure side thereof such as to allow it to be returned to sump 30.

It will be appreciated that the above-mentioned system and method provides an arrangement in which a fluid-working machine can be easily and quickly re-started after it has been stopped. Additionally, it will be appreciated that the re-starting step may be initiated in the same or the reverse of the previous direction of motion. Still further, it will be appreciated that the valve 34 or pump 26r when operated as a pressure dump system is, in effect, a depressurising means and a number of alternatives will be possible without departing from the spirit of the present invention which is to allow for depressurisation of the high pressure side of the supply so as to eliminate the pressure effect that any such high pressure fluid might be having on the motor 12 itself.

The invention claimed is:

1. A method of controlling a fluid working machine having: an output shaft; a plurality of working chambers of cyclically varying volume; a high pressure manifold and a low pressure manifold; one or more high pressure valves between one or more of said working chambers and said high pressure manifold; one or more low pressure valves between one or more of said working chambers and said low pressure manifold; and a de-pressuriser connected to said high pressure manifold; the method including the step of:
monitoring one or more parameters indicative of motor activity: and
actuating said de-pressuriser after detection of a pre-determined condition, thereby to release pressurised fluid within said high pressure supply.

2. A method as claimed in claim 1 and including the step of depressurising said high pressure manifold by operating a valve connected between said high pressure manifold and a low pressure source of fluid.

3. A method as claimed in claim 1 and including the step of depressurising said high pressure manifold by operating a valve adjacent said motor and connected between said high pressure manifold and a low pressure source of fluid.

4. A method as claimed in claim 1 and including the step of depressurising said high pressure manifold by operating said pump in reverse, thereby to draw high pressure fluid from said supply line and return it to a source of low pressure fluid.

5. A method as claimed in claim 1 and including the step of depressurising said high pressure manifold by causing said pump to go "over centre", thereby to allow fluid to pass through said pump from said supply line and return it to a source of low pressure fluid.

6. A method as claimed in claim 1 in which the monitored parameter is one or other of: engine shaft position, vehicle throttle position, vehicle gearbox, vehicle brake or vehicle movement.

7. A method as claimed in claim 1 including the step of determination of the new intended direction of motion of the motor.

8. A method as claimed in claim 7 in which said determination is made after depressurisation of said high pressure manifold is completed.

9. A method as claimed in claim 1 and including the step of pre-positioning one or more of said high pressure and/or low pressure valves during or after the de-pressurisation step.

10. A method as claimed in claim 9 and including the further step of pre-positioning said valves in the sequence of subsequent operation.

11. A method as claimed in claim 1 and including the step of de-activating said depressuriser prior to a subsequent recommencement of fluid flow to said working chambers.

12. A method as claimed in claim 1 including the step of setting said high pressure and low pressure valves to cause forward direction motion of said shaft upon supply of fluid to said working chambers.

13. A method as claimed in claim 12 including the step of separating the actuation of said valves by a period of time thereby to avoid valve pulses overlapping.

14. A method as claimed in claim 1 including the step of setting said high pressure and low pressure valves to cause reverse direction motion of said shaft upon supply of fluid to said working chambers.

15. A method as claimed in claim 1 including the step of commencing activation of at least one of said high pressure and low pressure valves in accordance with a sequence associated with the desired direction of shaft motion.

16. A fluid working machine having:
an output shaft;
a shaft position sensor;
a plurality of working chambers of cyclically varying volume;
a high pressure manifold and a low pressure manifold;
one or more high pressure valves between one or more of said working cylinders and said high pressure manifold;
one or more low pressure valves between one or more of said working cylinders and said low pressure manifold;
a sump;
a pump;
a de-pressuriser connected between said high pressure manifold and said sump; and
a controller connected to said shaft position sensor for receiving shaft position data and to said de-pressuriser for causing operation thereof such as to de-pressurise said high pressure manifold dependent upon the detected position of said shaft.

17. A machine as claimed in claim 16 wherein said de-pressuriser comprises a valve adjacent said high pressure manifold and distant from said pump and being connected between said supply manifold and said sump.

18. A machine as claimed in claim 16 wherein said de-pressuriser comprises said pump and wherein said pump is reversible, thereby to withdraw fluid from said supply manifold.

19. A machine as claimed in claim 16 wherein said de-pressuriser is comprises said pump and wherein said pump can go "over centre" so as to allow fluid from said supply manifold to pass through said pump.

20. A fluid-working machine as claimed in claim 16 including a monitor for monitoring one or other of: vehicle throttle position, vehicle gearbox, vehicle brake or vehicle movement.

21. A fluid-working machine as claimed in claim 16 in which said working chambers comprise cylinders having pistons contained and movable therein and in which said pistons are connected to said shaft for rotational movement of said shaft upon movement of said pistons.

22. A fluid-working machine as claimed in claim 21 in which said shaft includes an eccentric cam surface and said pistons are operably connected thereto for driving said cam and shaft upon movement of said pistons.

23. A fluid working machine having:
an output shaft;
a shaft position sensor;
a plurality of working chambers of cyclically varying volume;
a high pressure manifold and a low pressure manifold;
one or more high pressure valves between one or more of said working cylinders and said high pressure manifold;
one or more low pressure valves between one or more of said working cylinders and said low pressure manifold; and
a de-pressuriser connected between said high pressure manifold, wherein said de-pressuriser comprises a pump and wherein said pump is reversible, thereby to withdraw fluid from said supply manifold.

24. A fluid working machine having:
an output shaft;
a shaft position sensor;

a plurality of working chambers of cyclically varying volume;
a high pressure manifold and a low pressure manifold;
one or more high pressure valves between one or more of said working cylinders and said high pressure manifold;
one or more low pressure valves between one or more of said working cylinders and said low pressure manifold; and
a de-pressuriser connected between said high pressure manifold, wherein said de-pressuriser comprises a pump and wherein said pump can go "over centre" so as to allow fluid from said supply manifold to pass through said pump.

* * * * *